Dec. 6, 1960      L. W. BEAVEN      2,962,861
TWO AND FOUR CYCLE TURBOCYL HIGH PRESSURE TURBINE ENGINE
Filed June 23, 1958      6 Sheets-Sheet 1

Leslie W. Beaven
INVENTOR

L. W. BEAVEN 2,962,861

TWO AND FOUR CYCLE TURBOCYL HIGH PRESSURE TURBINE ENGINE

Filed June 23, 1958

4 CYCLE THREE PAIRS
DOWN-SEQUENCE

FIG. 11

4 CYCLE TWO PAIRS
DOWN-SEQUENCE

Leslie W. Beaven
INVENTOR

Dec. 6, 1960 L. W. BEAVEN 2,962,861
TWO AND FOUR CYCLE TURBOCYL HIGH PRESSURE TURBINE ENGINE
Filed June 23, 1958 6 Sheets-Sheet 4

Leslie W. Beaven
INVENTOR

FIG. 19 TWO CYCLE DOWN-SEQUENCE

FIG. 20 TWO CYCLE UP-SEQUENCE

FIG. 17 4 CYCLE. FOUR PAIRS. DOWN-SEQUENCE

TWO CYCLE DOWN-SEQUENCE FIG. 18

2,962,861

TWO AND FOUR CYCLE TURBOCYL HIGH PRESSURE TURBINE ENGINE

Leslie W. Beaven, 44 E. Washington St., Palatine, Ill.

Filed June 23, 1958, Ser. No. 743,830

8 Claims. (Cl. 60—39.34)

This invention is an improvement on the turboprop axial gas turbine which operates on low pressure combustion, being wide open at both ends and which also has unnecessarily high velocity losses out the exhaust pipe, even though the exhaust does perform varying amounts of work.

Otto learned long ago that efficient expansion means of recovering power with heat engines, required that the fuel-air mixture be compressed before ignition and we later carried the compression ratio much higher than he ever did and with greatly increased benefits. Since the advent of the gas turbine it has been convenient to accept low compression losses.

To increase the efficiency of combustion, the gases must be burned in compressed confinement. To increase the power recovery, expansion can be supplemented by reaction, by causing the exhaust from the expansion means to jet contra-spinwise as in a reaction or pressure turbine, or to impinge on curved blades, as in an impulse turbine.

In the axial gas turbine, the overall pressure range is small and although some gain could be derived from a reaction step, the result is much better when we use cylinder-piston means for the first step because of the increased pressure drop. It is just as easy to spin light weight cylinders, as to spin a mass assembly of bladed plates. The volume of the exhaust and the rate of fuel consumption are greatly reduced with cylinders.

In cooling an axial turbine, excess air is introduced into the interior of the burning chamber where it chills the combustion and increases the smoke. In the within invention, the coolant air is exterior to the combustion, the burning temperature much higher and the combustion more complete. Therefore this invention relates to internal combustion engines of the expansion-reaction type in which the cylinder-crankcase assembly is the rotor and the crankshaft and supporting frame is the stator. The cylinders spin about the power axis, on the main bearings of the engine while the pistons spin about the axis of the crankpin or crankpins, depending on whether or not the engine has a single row of cylinders or multiple rows.

In order to discuss the within cylinder and crankpin arrangement conveniently, it is necessary to abandon the more general term "row" as applied to the cylinder axes and use the terms "rank" and "file." In a rotary radial engine, the cylinders approach their firing points in single file, the files lying in planes perpendicular to the engine axis. The files could be staggered, with reference to each other in a number of ways but this application deals with matching them so that the cylinders in the files come abreast in ranks parallel to the axis of the engine. Turbine velocity is contemplated which requires greater coolant flow and greater strength of construction. Assembling the cylinders in ranks aids coolant flow, permits the use of ram effect to assist the charging and also permits the passage of heavy thru-bolts in long engines having a plurality of files of cylinders, to assist in enduring the tension stresses to prevent bending as in a beam, for which the customary flange bolting otherwise might be inadequate.

It has been found advantageous, unless the power requirement is quite small, to put the files of cylinders in electrical pairs, i.e., one pair of files, two, three, four pairs etc. This simplifies markedly, the ignition wiring and can as here done, provide easy accessibility for ignition timing.

In four-cycle, this pairing is also cyclically functional, in that it permits halving the number of crankpin axes, thereby compacting the ignition timing region.

In two-cycle the number of cylinders in a file can be odd or even. In four-cycle it must be odd, if the crankshaft is static.

In four-cycle, with the cylinders in rank, the crankpins for each pair of files will best share a common crankpin axis. The stagger between each pair should be a functional one of 360 degrees which is a physical one of zero. In a functional or valving sense it would mean that one cylinder was starting its work stroke as its twin starts intake, both being mechanically at top dead center but one functionally one revolution behind its twin.

They could be staggered in other ways but without advantage except for other purposes than here intended.

It reduces the diameter of the engine to double the number of files rather than to put the cylinders all in one file.

It reduces the gyroscopic effect to reduce the radius of gyration thereby.

It assists the cooling to keep the size of the cylinders small and their number large, since the ratio of cylinder surface to cylinder volume is larger if the cylinder is made smaller.

The foregoing improvements are all objectives. Another objective is the feeding of fuel by injecting it into the firing chamber thru the valve driver shaft, in proper sequence for four-cycle, by means of an alternate on and off valve. This alternate valving is not required in two cycle. That and one other difference (valve timing), both very nominal matters, constitute the full mechanical difference between the two-cycle and four-cycle systems when the within mechanism is used. This is a manufacturing advantage.

Another object is to increase the precision of the timing of the ignition spark. Present engines may have their breaker points precisely set on a machine and the engine may then be run and the timer set to the most satisfactory running position obtainable but this gives no assurance that each cylinder is doing its full share of the work. There are so many sets of tolerances involved in the manufacture of the parts that adverse build-ups can occur in a plus direction to one set and minus to another. Also they may wear unequally. Selective fits are distinctly impractical. But it is very important that the maximum pressure from the combustion should occur at top dead center in each cylinder and not before or after. Ignition timing is very critical. Current automobile engines often make one revolution in one-sixtieth of a second. The effective work stroke may average about three-sevenths of a revolution, so that an error of one-hundred-and-fortieths of a second, would cancel out the cylinder's whole work stroke and one two-hundred-and-eightieths of a second, would cancel out half of it. With present engines it is very difficult to detect a material fault in this regard and because of their present design there is no practical remedy. But with the engine shown, each cylinder can easily be individually timed to within one fifteen-thousandth of a second, nullifying the variations due to manufacturing tolerances and wear in service.

Additional breaker points are required, one set for each cylinder instead of the usual one or two sets per engine. The change is justified by the power gain and the additional breakers divide the work and severity involved, so that the points are much less apt to heat and burn because the frequency of the breaking arc is reduced and the cost per thousand miles for points and for fuel is considerably reduced. Also breaker trouble becomes less disastrous, involving only one cylinder at a time instead of complete engine failure as we have it now.

The distribution of the work impulses and therefore of the crankpin axes, can be made in a number of ways but for my purposes the points of top dead center should be accessible for accurate timing and consideration of all factors indicates they should preferably be clustered on the top side of an automobile engine or single engine plane engine and on the side of an airplane engine when the engines hang down from the plane wing. A novel firing order easily committed to memory is important in assembling and in servicing and this is an objective.

It has been the custom in large engines to put as many as seven or nine cylinders in a file. I will derive formulas to cover any required number of cylinders and files but for illustrative purposes three cylinders in each file ($c$ equals 3), suffice to make the arrangement understandable and practical. This also applies the lessons learned which have already been stated.

In four-cycle a cylinder must make two revolutions to complete all four strokes of the cycle so each cylinder must reach top dead center twice per cycle. Therefore, the angle between the cylinders in a file must be 720 degrees over $2c$ or 120 degrees. In two cycle it is 360 degrees over $c$, also 120 degrees.

But to simplify the ignition system, which may be by compression with electric spark for starting, or by electric spark for both starting and running, if not otherwise, it is advantageous to put the electrical switching means between two files of cylinders. If the pair of files have a common crankpin axis, something we cannot do with two-cycle with cylinders in rank, then the number of crankpin axes is halved for the same number of cylinders. It is the uniform firing interval requirement that controls the stagger of crankpin axes when there is no physical stagger of the cylinders.

If "P" represents the number of pairs of files, then for a single file the value of "P" is ½ and the firing interval is 720 degrees over $2cP$, equals 240 degrees when $c$ equals 3 and P equals ½. If we have one pair of files, the value of P is one and the firing interval is 120 degrees. If P equals 2 it is 60 degrees, if 3, 40; if 4, 30; if 8, 15; etc.

If the cylinders in each file are numbered 1, 2, 3; in their firing order (every other one in the case of four-cycle), then the numbering sequences in the files are in opposite directions for two and four-cyce, when $c$ equals 3. But the ranks in which the cylinders lie are numbered 1, 2, 3, in the order in which they approach a line parallel.

Therefore, practical methods of arranging an expansion-reaction engine with relatively small flight resistance, tremendous H.P., of multiplied economy, dependably cooled and with charging and cooling assisted by ramming, are also objectives.

These and additional objects and features will become more readily apparent as the following more detailed description proceeds, taken in conjunction with the accompanying drawings in which:

Fig. 16A is a longitudinal section of an alternate form of the front end of the subject engine in cases where it is exceptionally long and some combustion air is admitted directly at the front of the crankcase to equalize the pressure drop due to the exceptionally long flow path. The openings are protected by a screen. The flow is assisted by a concentric ring of fan blades embodied in the front end cover plate of the crankcase.

Fig. 16B is a developed sectional view thru the fan blades in the alternate form of the front cover plate shown in Fig. 16A.

Figures 1, 2, 3, 5, 6:
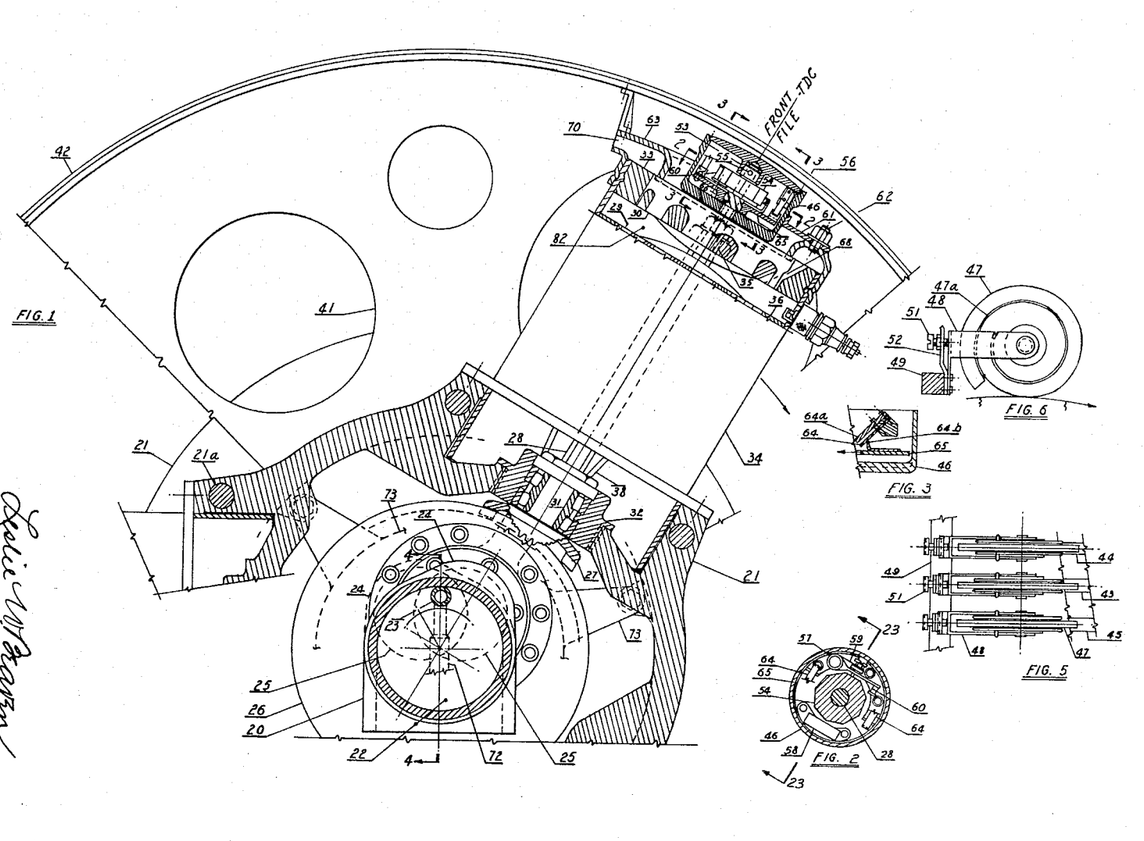
Fig. 1 is an end view of such an engine in which numerous details of construction are exposed by section.
Fig. 2 is a transverse section across the timer or breaker box, taken on lines 2—2 of Fig. 1, showing a typical breaker and points assembly plus new detent springs which resist centrifugal forces.
Fig. 3 is a sectional view of a part of the breaker box, taken as indicated by section lines 3—3 in Fig. 1, the box being fastened and supporting the detent springs and stops, the mounting plate pivotally supported.
Fig. 5 shows a three-gang of carbon brushes held in brushholder forks and with spiral tension springs, mounted to a brushholder support which holds the brushes in engagement with the outside periphery of the rim around the cylinders.
Fig. 6 is an end view in elevation, of one of the brush units, showing the mounting, the fork, the spiral spring and the spiral carbon brush.
Figure 12:
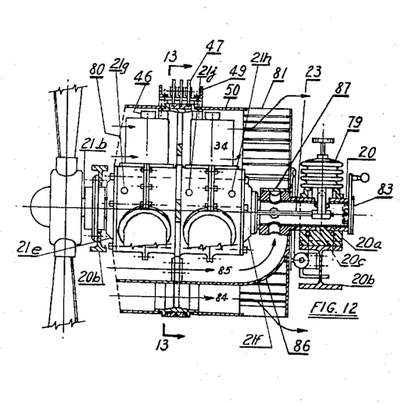
Fig. 12 is a side elevation of this improved turbine engine, partly in section, with parts omitted, showing the application of the ram principle, to aid in the charging of the cylinders and for aiding the coolant air flow. The fan is of centrifugal type.
Figure 15:
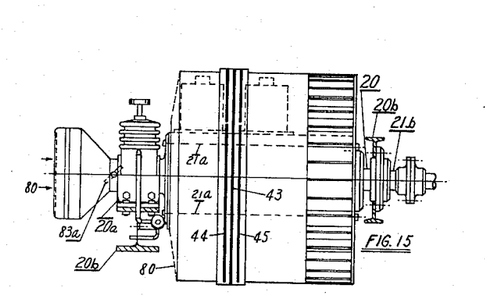
Fig. 15 is similar to Fig. 12 but for automobile service, the main difference being due to the fact that the powershaft points forward on a plane and backward on a car. The electrical switching means is shown but the frame and brush supports were not repeated.
Figure 16:
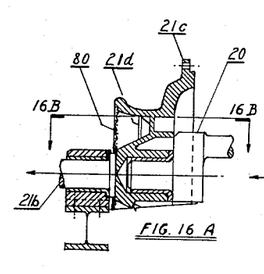
Fig. 16 is a developed view of the coolant air circulation with especial regard to long engines with many files of cylinders whereby the back files can be kept at the same temperature as the front files by an intermediate flow.
Figure 22:
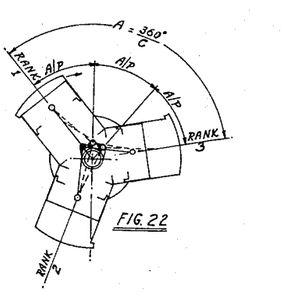
Fig. 22 is an end view of the 18 cylinder four-cycle engine viewed from the front as indicated by section lines 22—22 in Fig. 11 and shows the physical relationship of the ranks of cylinders to the staggered crankpins from that viewpoint.

Referring now more specifically to Fig. 1, number 20 indicates the stationary crankshaft which is keyed, Figs. 12 and 15, to the support 20a for the hollow end of the crankshaft, the said support being bolted to the support frame 20b, the said key, 20c, being a tongue projecting from said support, thru the lower wall of said hollow end of said crankshaft. The other end of the crankshaft pilots, in Figs. 12 and 15, in the end cover plate 21e, Fig. 12, or in 21c in Fig. 16A of the assembled crankcase 21, the said plate having a central live spur-shaft 21b extending therefrom, to form the power-shaft in either case, of the engine. Thru-bolts 21a hold the separate sections of the crankcase together, assisted by flange bolting. The crankcase is journaled for rotation on the fixed shaft at the hollow end and on the live spur-shaft at the other which in turn pilots thru a bearing, also supported by the frame. The crankcase sections are usually called end sections 21g and 21h and intermediate sections 21j. An alternate front end section 21c is provided for extra long engines and is discussed later. The support frame 20b was omitted from Fig. 1 so as not to obscure parts of more specific interest there. The near-side end of the said crankshaft as seen in Figs. 1 and 22 is hollow for entrance of air into the assembled crankcase and the air channel 22 turns downward, inside the crankcase. Shown in section is the fuel pipe 23.

In Fig. 1, two crank-throws 24, one seen and one dotted, are shown and their hidden crankpins 25 are also indicated. A worm-plate 26, the worm concentric with the main axis of the engine, is fixedly attached to the fixed crankshaft. The function of the worm is to drive the valve-shaft gear 27 which drives the valve-driver shaft 28 which drives the intake valve rotor 29, Fig. 4, the exhaust valve rotor 30 and the ignition cam, discussed later. The valve driver shaft is journaled at its inner end by suitable radial-axial thrust roller bearings 31, supported in their housing 32 which is part of the crankcase, and at its outer end, pilots concentrically into its exhaust valve rotor 30 which is journaled in its stator 33, the latter being assembled preferably concentric to the cylinder 34, in turn attached as by flange bolting to the crankcase 21. The exhaust valve rotor is firmly held by any suitable means, as by taper 35, of the shown hexagonal valve-shaft 28, and by nut 28b, Fig. 23, and lock-washer.

Figure 4:
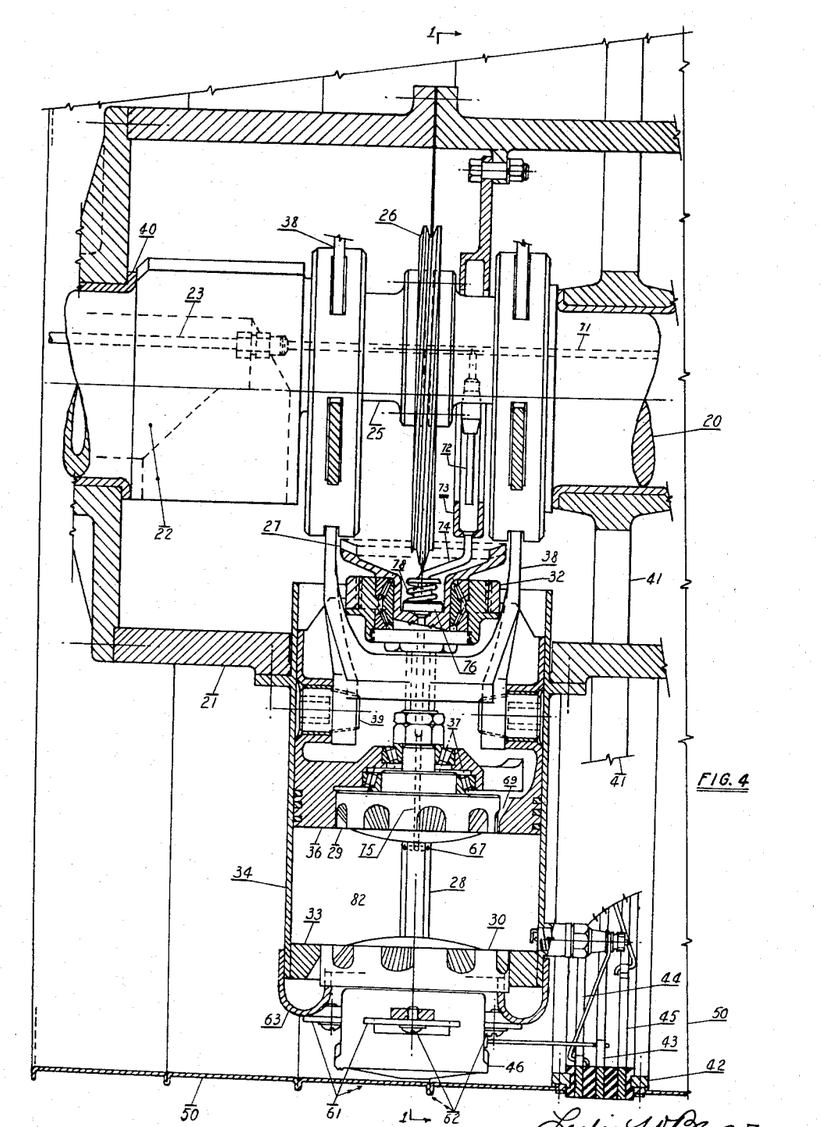
Fig. 4 is a longitudinal section taken as indicated by section lines 4—4 in Fig. 1 and passing thru one of the cylinders when it is at bottom dead center and is taking fuel into the firing chamber.

The shaft passes axially thru the piston 36, Fig. 4, in which the intake valve rotor 29 is also supported on suitable radial-axial thrust roller bearings 37, the piston as shown, acting as the intake valve stator. The intake valve rotor is close-fitted to slide on the said driver shaft as the piston slides in the cylinder but is obliged to turn with the shaft by the hexagonal shape thereof. The pistons are driven slideably by the aforesaid crank-throws, being connected to the crankpins by the assembly of connecting rods or pitmen 38, Fig. 4 at one end and by the wrist pins 39 at the piston end.

The pistons therefore are being spun about the crankpins while the cylinders spin about the power axis of the engine, the crankcase carrying the cylinders and being journaled for rotation on the fixed crankshaft by engine main bearings 40.

The crankcase is sectional, comprising a front end barrel section, first intermediate barrel, rear end barrel and front and rear cover plates. They join on the transverse planes that include the axes of the cylinders in each file, and are held by flange bolting plus long thru-bolts 21a when the engine is long. If the engine comprises more than one pair of files of cylinders there will be second or third etc., intermediate barrel sections.

This arrangement simplifies assembly. The various sections have matching half-circle openings for the files of cylinders with some spacing between from which a perforated flange 41 extends outwardly and terminates in a surrounding turned rim 42 which supports a cylindrical shroud 50 on each side thereof for containing the coolant air currents. Additional baffle plates 41a are required for long engines to equalize the cooling of the rearward cylinders. The outside of the rim is made into a combination slip-ring and commutator with an insulated slip-ring 43 preferably in the middle for primary current and on each side thereof, commutator segments 44 and 45 for secondary. The slip-ring 43 carries low tension current to the breaker boxes or timers 46, the segments 44 and 45 carrying high tension current for their adjacent spark plugs in the corresponding cylinders, to which they are connected preferably by bare wires insulated from the structure.

Figure 13:
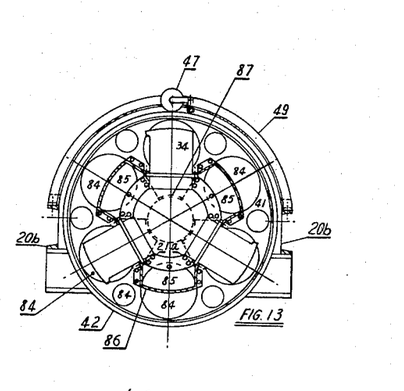
Fig. 13 is a sectional view with parts omitted, seen as indicated by section lines 13—13 on Fig. 12. It shows the reaction nozzle on each cylinder, the flow paths of combustion and coolant air, the thru bolting, the flange bolting, the ignition current brushes and their supports.

The low tension current is received by the ring 43 from the carbon brush 47, being the middle one in Fig. 5 and the high tension current is received by the bars 44 and 45 from the outer brushes 47. A standard type of electrical brush could be used but with the diameter and velocity involved I decided to use a special type having more feed travel and less bind than radially pushed rod-carbons. Fig. 6 shows the brush 47 with its two sided spiral spring 47a, the brush holder fork 48 and the brush mounting bar which is part of the brush assembly supporting frame 49, Fig. 13. The periphery of the brush is a spiral, as is the curve of the two sided spring, the radius in both cases increasing with the angle of turn. The spring tends to turn the brush so as to increase the angle and the contact pressure, the drag of the commutator bars and slip ring tending to oppose the spring and reduce the friction. An adjusting screw 51 supported by a flat spring 52 which is stiffer than the supporting arm of the fork 48 serves to get the correct amount of drag on the brush.

The valve-driver shaft 28 does not end with the exhaust valve rotor holder nut but continues in a reduced diameter up into the pilot bearing 53 of the cap 46a of the breaker box 46. The pilot bearing for the shaft and the breaker cam 54 are shown one piece which is closely slip fitted onto the end of the valve-driver shaft 28 and fixedly held in only one physical relationship with the shaft as by a taper pin 55 so that the cam must turn with the shaft without looseness and can only be assembled one way.

Figure 23:
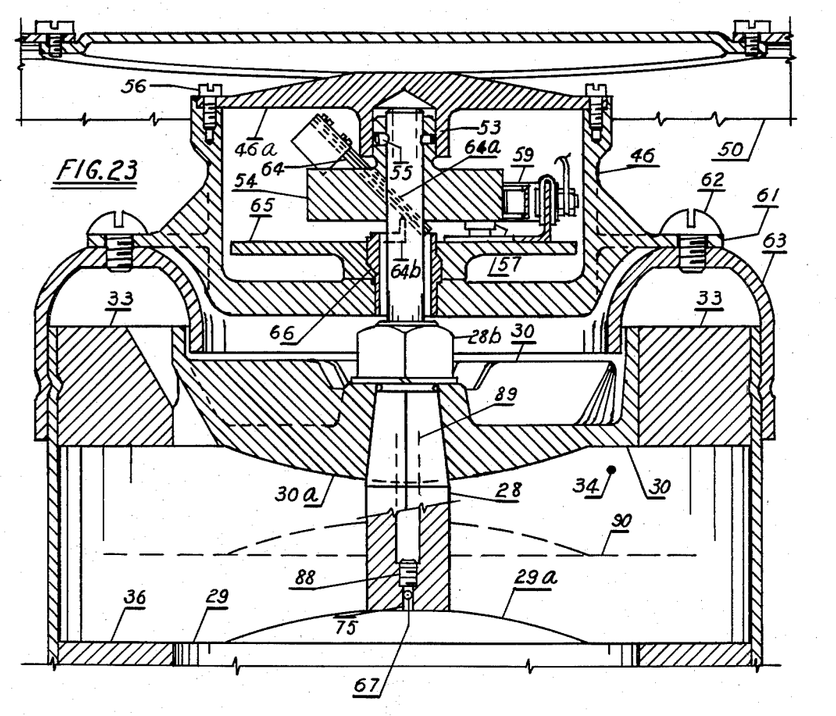
Fig. 23 is an enlarged section thru the breaker box and cylinder head, taken as indicated in Fig. 2 by section lines 23—23 to show the details around the ends of the valve driver shaft and cylinder, and the piston.

A threaded plug 88, Fig. 23, closes the fuel feed channel 75 and the axial access channel 89 is provided as a means of access to the plug for cleanout purposes. The dash lines labelled 90 show an upper position of the piston head 29 as it reciprocates in the cylinder 34, covering and uncovering the fuel feed duct 67. The open port of the exhaust valve 30 however shows that the exhaust ports are open, so the fuel line, open at 67, is closed at the outlet hole 77 (shown open in Fig. 7).

The breaker box cover is removable, held by screws 56, for access to the breaker points assembly 57 and condenser 58 thru an indicated aperture in the shroud. The points assembly 57 and condenser 58 are standard parts which are readily available and do not require description except to say that a flat spring 59 in the assembly tends to force the contact points 60 together to make the circuit and the high points in the cam separates the points to break the circuit. The timing of the break is the important one of the two functions as it is the break that causes the spark in the plugs, by collapsing the field in the ignition coil, not shown.

The breaker box or timer 46 is held in place by brackets 61 and hold-down screws 62, to the exhaust bonnet 63 but the brackets have arcuate slots which permit the breaker box to rotate thru a small arc as in present timers, when the screws are not tightened, to make close adjustments in its setting. This permits trial and error setting of the break. The cylinder to be timed is rocked back and forth past a timing mark designating top dead center to fix the earliest firing point for an engine not running. A typical plate and arrow, one on the rotor, the other on the stator are also standard equipment for this purpose and so are not detailed. This still-setting results in the elimination of clearances between the timer parts, influenced by the inertia forces of running, and two flat detent springs 64 which may comprise one or several leaves to get the correct rate of detention. They are mounted in the breaker box. Above them are stops 64a, to limit the advance of the floating plate 65. The timer is now clamped down permanently with retarded spark setting on all cylinders. The variation for advance is preset in the manufacture of the timer according to the r.p.m. and the radius of gyration of the particular model of engine.

The advancing mechanism comprises a hollow screwpiece 66, press fitted, concentrically and axially located and permanently fixed as by brazing or welding, to the breaker box bottom. It is spirally slip-threaded on its outer diameter, the threads being shown on a 45 degree pitch angle, to a planetary mounting plate 65 and the small end of the valve-driver shaft 28 passes thru the hollow center and does not touch the plate or cam. The plate derives its operating force, not from the shaft but from the centrifugal forces developed in itself by its own weight and the loads riding on it, the points assembly and the condenser, so that when it is forced radially outward from the rotational center by said forces, the threads on the outer diameter of the cam piece force the planetary plate to turn on its axis and carry the set of points 57 and the condenser 58 concentrically around the breaker cam and rotationally in opposite direction to that of the cam, thereby causing the breaker cam rider to engage the cam humps sooner thus causing an earlier spark. The calibrated detent springs 64 oppose the turning by bearing on the lip 64b, in the measure fixed in manufacture by experiment so that the timing advance will be correct for the engine used.

By careful setting of the breaker boxes, all the build-up of manufacturing tolerances is neutralized and the spark can be made to cause the maximum pressure of the gas explosion to occur at top dead center and not before or after, except for a very minute setting tolerance to be seen by rocking each cylinder past the marking point.

In the various showings of cylinder arrangement, the crankpins are indicated by small circles and the one firing is solid black in all cases. The files are lettered to show by alphabetical order, the order in which the files participate in the firing funciton. The stagger of the crankpin axes is always 360 degrees, divided by the number of units of cylinders times the number of cylinders in a file ($360/cU$). The number of staggers is ($U-1$). The staggered arc is $360(U-1)/cU$. The unstaggered arc is $360-360(U-1)/cU$. In four-cycle, the unit building block for large engines is the pair (P). In two-cycle, it is the file (F) or half pair. That has nothing to do with the electrical pairing which is done in both cases to simplify the wiring problem in multi-cylinder engines.

The relation of the arc subtended between successive crankpin axes, to that subtended between ranks, is one over U, derived from 360 over $cU$ divided by 360 over $c$.

Figure 10:
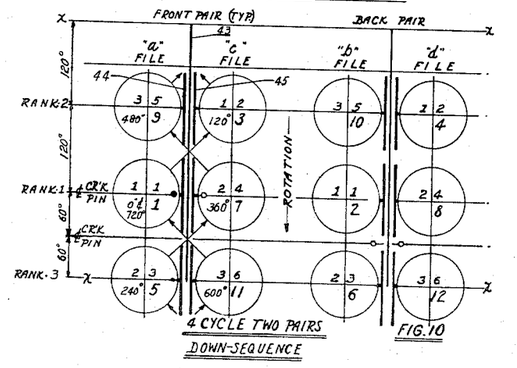
Fig. 10 is a developed view of the cylinders when there are two pairs of files. The graphic relation of the crankpins is shown along with some pertinent notes and angles. The firing order is shown in each file, in each pair and for the whole group. The electrical slip-ring and the commutator bars are graphically shown. For four-cycle, the pair is the fundamental building block for larger engines.
Figure 11:
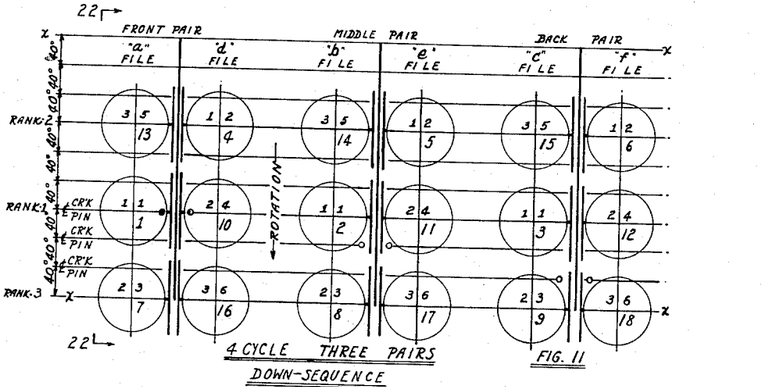
Fig. 11 is similar to Fig. 10 but for three pairs of files and with degrees omitted.
Figure 17:
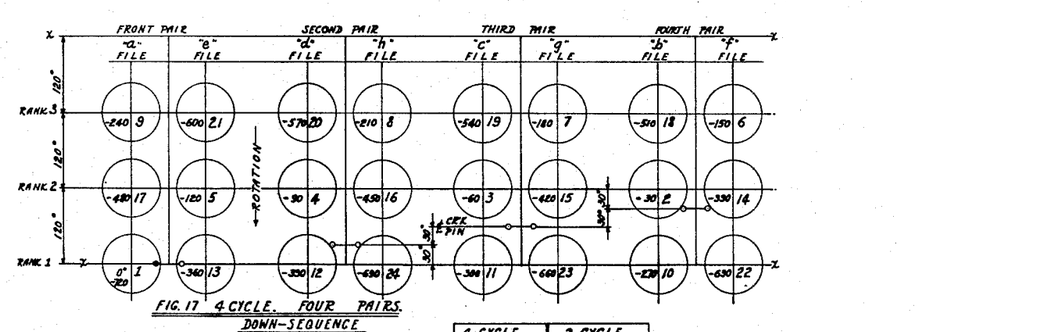
Fig. 17 is a developed view showing the firing order for a 24 cylinder four-cycle engine. It comprises four unit pairs such as shown in Fig. 10, with the electric means not shown.

Figs. 10, 11, and 17 are all four-cycle. The crankpin axes are arranged like a descending stairway for a "cascade of cylinders," their impulse order descending in Figs. 10 and 11 from rear to front, and in Fig. 17, from front to rear. In both types of descent, this down sequence is the one that gives the minimum range of crankpin axes. The range is increased by adding cylinder pairs or files but always remains within adjoining ranks.

I have indicated in the upper left-hand quadrant of each cylinder, in each file, the firing order in that file, on a four cycle basis.

I have indicated in the uper right-hand quadrant of each pair of files, the firing order in that pair. This pair shows a systematic zig-zag repetitive order that is symmetrical for the pair and it should be noted that the pair is the fundamental building block, for larger engines of four-cycle type.

I have indicated in the lower right-hand quadrant, the firing order of the whole engine series.

I have indicated in the lower left-hand quadrant, the number of degrees that the cylinder will have to turn before reaching the beginning of its work stroke after being fired. A typical pattern is discernable. Each file, each pair of files, and the whole series, all fire symmetrically. The basic unit is the pair of files and any number of pairs can be used to make any size of engine desired, Figs. 10, 11 and 17 being examples. The zig-zag pattern of firing sequence, indicated by arrows in the front pair of Fig. 10 is typical of all pairs of files.

Figure 18:
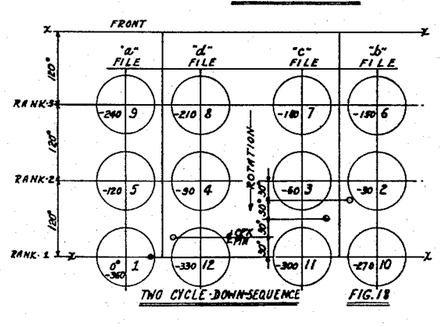
Fig. 18 is a developed view of the firing order of a twelve cylinder two-cycle engine. Here, the fundamental building unit, is the single file, although electrically, they are arranged in pairs as in four-cycle. The switching means is not shown.
Figure 19:
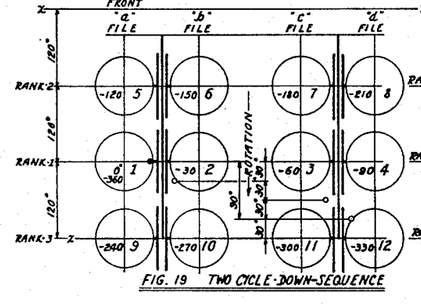
Fig. 19 is another firing order arrangement of 12 cylinders, operating on two-cycle.
Figure 20:
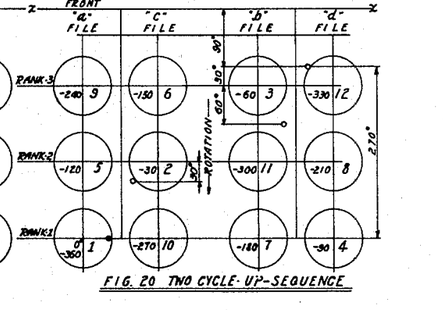
Fig. 20 is another firing order arrangement of 12 cylinders operating on two-cycle. The electrical means is not shown.
Figure 21:
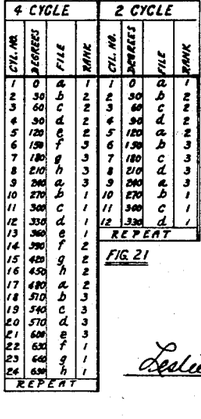
Fig. 21 is a chart of the firing order in Figs. 17 and 18. The two show similarities, notwithstanding one is four-cycle and the other two-cycle.

Figs. 18 and 19, both two-cycle, show the same thing. Fig. 20, two-cycle, shows an up-sequence. This ascending order is the one that spreads the points of accessibility. The reason is obvious. The down-sequence confines the impulse points within adjoining ranks. The up-sequence does not.

It is apparent that both two and four-cycle form a stair pattern. The two-cycle "risers" are half as high, going 120 degrees in four steps in Fig. 18 and the four-cycle going 120 degrees in two steps in Fig. 10, both engines having 12 cylinders.

The engine functions would not be disturbed by scrambling the sequence of the steps, i.e., the file sequence but that would destroy the chance of a novel sequence of firing order, easy to commit to memory. Therefore both the scrambled sequence, not shown, and the up-sequence shown in Fig. 20, are unworthy of further consideration in this regard.

The remaining, comprise both two and four-cycle and they are down-sequence. However Figs. 17 and 18, number the cylinders from the rear and Figs. 10, 11 and 19 from the front. The order in Figs. 17 and 18 is somewhat confusing because the switch from the back file grouping to the front file grouping, i.e., #24 to #1 (or 25), Fig. 17, comes within rank 1 instead of being simultaneous with the switch from one rank to the next behind, as in Figs. 10 and 11.

The simplest pattern is found in Fig. 19 which is two-cycle, with the sequence running from front to rear in each rank and repeat in each succeeding rank no matter how many pairs of files there are. Rear to front would be equally acceptable. A similar pattern is found in four-cycle, in Figs. 10 and 11, with this difference; the typical rearward sequence in a rank is first confined to the front files of each pair, then to the rear files in the succeeding rank and repeat, until all the cylinders have fired around. The total reverse is equally acceptable.

Figs. 10, 11 and 19 contain the novel sequence, easy to commit to memory and that establishes the crankpin axes closely grouped as shown in those figures, or the reverse order thereof.

No consideration has been given to timing changes by vacuum diaphragm, a doubtful addition, most especially in view of the more glaring omission cited here with one general timer for all or half of the cylinders as is the custom.

Reduced density of the combustion mixture does cause slower combustion. It also causes reduced engine speed and so reduced advance of spark. There is no other means required.

A word about the functioning of the engine probably is advisable, in relation to flow of air, of fuel and of valving. Fig. 15 shows the hollow end of the crankshaft faced forward as for automobile use, where the power shaft must extend rearward. In airplane use however, the power shaft must extend forward and the rammed air must be delivered to the rear end of the engine to enter the hollow end of the shaft, as shown in Fig. 12. There is still another arrangement for use in very long aviation engines to remedy intolerable pressure drops in the front files of cylinders, where the front end section of the crankcase is superseded by 21c, the one shown in Figs. 16A and 16B, the crankshaft being also modified as therein shown. This permits some air to enter at the front end, to permit more uniform distribution of the pressure in the crankcase. An appropriate screen or filter 80, the flared horn-like entrance, protects against entry of foreign matter. Fan blades 21d assist movement of air and leave interstices thru which the air enters.

Figure 14:
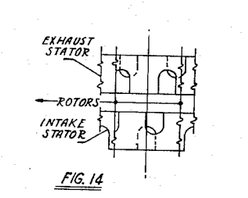
Fig. 14 is a diagrammatic of the valving surfaces of the exhaust and intake valves, laid out flat and showing their relations at top dead center, with the exhaust valve closing late and the intake valve opening early. The view is that looking from the inside, radially outward at the far side matching of the ports.

The air for combustion is ram-packed by the velocity of the vehicle, into the hollow end of the crankshaft and flows therethru to enter the crankcase, where it is spun into a vortex. It is thus forcibly packed against the under sides of the pistons until an intake valve opens in one of the pistons to let it into the firing chamber of that cylinder. At the bottom dead center the piston uncovers the small fuel feed holes 67 in the valve driver shaft, letting the fuel enter during about 20 degrees of engine turn. The mixture is then compressed and fired, the intake valve having closed. The work stroke then starts, and ends around bottom dead center where exhaust begins with the opening of the exhaust valve. The opening and closing of both intake and exhaust valves comprised of matching the ports or notches in the outer edges of the rotors with the inner edges of the stators as shown in Fig. 14. In the drawings nine paired sets are shown in each valve but the number could be more or less than nine. The more there are the slower the valve must turn. All nine match simultaneously at each superposition and at the appointed time for each valve. There are then nine ports open, similar to those shown at 68 in Fig. 1 for exhaust and 69 in Fig. 4 for intake. The combustion mixture is compressed and burned, pushing the pistons inwardly and the burned gases spring out of the firing chamber and into the annular exhaust bonnet 63 and out the exhaust orifice 70 after their work stroke, to add reaction torque to the expansion torque of the crank means.

Fig. 4 shows the path of the fuel from the channel 71 in the crankshaft thru the quill 72 into the circular revolving trough 73 and by tube 74 into the channel 75 in the valve-driver shaft, to the said orifices 67. However at the inner end of the valve-driver shaft it passes thru a valve, if the engine is of four-cycle type. The function of the valve is to let it pass, only on every other inward stroke of the piston, particularly near the end of the stroke and the beginning of compression, and not the other one, the ending of work stroke and the beginning of exhaust stroke.

Figures 7, 8:
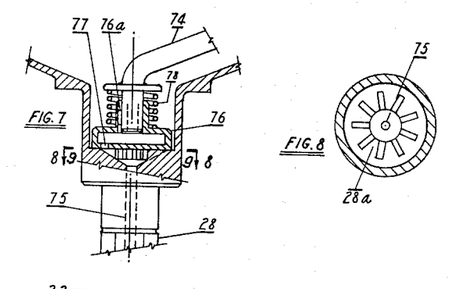
Fig. 7 is a view showing a section thru the fuel feed connection to the gear end of the valve driver shaft, showing a fuel valving shoe that nests in a revolving counterbore.
Fig. 8 is a transverse section showing the valve seat, taken as indicated by section 8—8 in Fig. 7 when the system is four-cycle.

This valve comprises a mushroom shaped shoe 76, Fig. 7, slip fitted on the fuel tube 74, the other end thereof being flanged, the flange having a passage therein, ending in an outlet hole 77 thru its outer face, off center to the left of the viewer. It rides on the face of a counterbore in the valveshaft, to which it is pressed for sealing purposes, by a spring 78 which fulcrums in a flange fixed to the fuel tube 74, by weld or brazing. The shoe preferably has a longitudinal keyway engaging a key 76a, fixed to the fuel tube to hold it from being rotated by the valve shaft but at the same time permitting it to slide longitudinally on said key and tube, to hold it seated to the face in the bottom of the counterbore. This face, Fig. 8, has nine slots spaced at 40 degrees, for engagement with the outlet hole 77, to pass the fuel at the proper time, the unslotted lands 28a, stopping its flow during the other periods.

Figure 9:
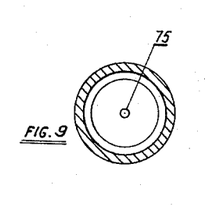
Fig. 9 is a similar transverse section showing the valve seat, taken as indicated by section 9—9 in Fig. 7, when the system is two-cycle.

In the two cycle type, this valve is not required because the fuel is taken at each inward stroke of the piston. In that case, the closure lands 28a, are omitted and the shoe operates only as a seal and the fuel is not stopped there. Fig. 9 shows its appearance in that case.

There are only three points of difference between the two and four-cycle types, the fuel valve lands 28a, the timing of the admission and exhaust, the timing of the ignition and the throws on the crankshaft. The latter requires separate crankshafts for engines of more than one row of cylinders. The preceding two can be handled by the gear-set comprising the worm-plate 26 and the valve-shaft gear 27 which must double the slow speed for four-cycle valving, to suit two cycle valving.

The fuel is metered by a bellows device 79, that fluctuates the rate of feed in proportion to the air density in the intake or hollow end 22, of the crankshaft, to which it is exposed and which effects the bellows, the latter carrying a metering needle of a fuel flow valve, on or off its seat, the needle being adjustable thereto. It flows thru the fuel pipe 23, the channel 71 in the shaft and the quill 72, into the fuel trough 73, then via the tube 74, to the fuel valve-shoe or seal 76, just described, the lands 28a and the fuel aperture 77 being coordinated for passage of fuel during the intake and compression cycles of the cylinder concerned and estopped by the lands 28a during the work and exhaust cycles.

The air for combustion and for cooling, enters thru a screen 80, on the front of the engine, assisted by ram effect of the motion of the vehicle it propels and also, in the case of a plane, by the propeller thereof which is driven by the engine. The charging is also assisted by the pistons, which on the intake stroke cause a partial vacuum in the firing chambers 82 in the cylinders. A sleeve throttle 83 controls the volume admitted, on the aviation engine, 83a on the automobile engine which has a butterfly throttle.

Both cooling and charging are further assisted by the centrifugal exhaust fan 81, on the back end of the engine. If the engine is for a stationary powerplant, the fan 81 would be of greater capacity and the fuel feeding device 79 would not require as much flexibility or pressure range.

The air paths are separate, the coolant air following path 84 and the combustion air, path 85, to the hollow crankshaft 22 into the crankcase thence thru the intake valve in the piston and into the firing chamber.

After combustion, and work, the exhaust valve opens and the gases pass thru to the exhaust bonnet and out its orifice 70 where reaction occurs, to assist the piston means. The escaping gases are then entrained by the coolant air in the passage 84 and into the influence of the exhaust fan for discharge.

The paths of coolant and combustion air are separated in one instance by a partition wall 86 and in the other by an anti-shunt shoe 87 so that the two paths of air cannot become confused.

The electrical circuits are typical, generally with the plus side of battery grounded to the engine, the negative side going to the manual switch, then to the input side of the coil primary, the other side of the primary going to the slip-ring brush riding the slip-ring 43, which permanently connects to all of the timers, on their insulated side of the breaker points. Only one set of these make at a time and break at a time, spark occurring at break, collapsing the field in the coil, which sends a surge of secondary high tension current to the outside carbon brush on the side effected, there being a separate coil for each file. The commutator bar then under the brush effected passes the ignition current to the plug concerned. These bars have their ends separated sufficiently and have insulating material between so that the current cannot bridge the gap and go to the wrong cylinder. They do not time the spark. They are long enough on each end so that the brushes are already on them when the surge comes thru and there is therefore no spark occurring between brush and commutator bar.

Alternate positions for spark plugs are shown because aviation engines frequently have two in each cylinder and automobile engines, usually one.

An enclosing shroud 50, of light sheet metal is shown, of cylindrical shape, supported on its intermediate ends by the commutator rim and at its outer ends, to the cylinders, for containing and guiding the flow of coolant air, neutral to the discharge of the exhaust at the exhaust orifice 70.

Certain modifications and revisions will suggest themselves to those skilled in the art and all such modifications and changes as come within the spirit of this invention are intended as being within its scope, best defined in the appended claims.

What I claim as new, and entitled to patent protection is:

1. In an internal combustion engine of the expansion-reaction type, wherein a crankcase and one or more rows of outstanding cylinders, pistons and associated expansion means rotate about a static crankshaft, hollow on one end for air intake to said crankcase and said cylinders eject their exhaust gases contraspinwise for reaction, a rotary intake and a rotary exhaust valve comprising each piston and cylinder head, the firing chamber between, a pivotally rotated valve driver shaft, said shaft axial to each cylinder for driving said valves, a channel in said shaft for supplying fuel to said firing chamber, an ignition breaker box individual to each cylinder, said box pivotable and adjustably supported to said cylinder for still-setting the ignition timing, a set of breaker points in each breaker box, said valve driver shaft extending into said breaker box, said extension embodying a cam for make and break operation of said breaker points, advancing means responsive to engine speed, to advance the spark, retarding means responsive to engine deceleration to retard it, when the engine is running.

2. In an engine as set forth in claim 1, the said advancing means comprising, a planetary mounting plate fixedly supporting thereto a typical set of breaker points and condenser, the plate slip-threaded to a hollow screw-piece, said piece fixed to said breaker box, said thread high pitched to convert axial thrust on said mounting plate into pivotal rotation thereof about the axis of said thread, said thread axis being substantially coaxial with said cam, the source of the thrust being the centrifugal force developed by the mass concentrated in and on said mounting plate and its instantaneous velocity in revolving about said engine crankshaft, the means for retarding in proper measure said rotation of said mounting plate comprising at least one calibrated detent spring, said spring mounted to said breaker box by one end, the free end acting against said mounting plate parallel to the slope of the pitch of said screw-piece thread, to screw said mounting plate inward toward said engine center, and a stop to limit the flexing of said spring.

3. In a rotary internal combustion engine of the expansion-reaction type, a static crankshaft, the engine rotor embodying a crankcase, cylinder-piston means comprising the expansion means and exhaust means comprising the reaction means, said cylinders mounted to said crankcase in rank and file, each successive file thereof comprising a functionally separate "building block" unit for large engines, a rotary valve driver shaft assembly in each cylinder, each said assembly comprising intake and exhaust valve means, fuel feeding means and ignition timing means, the shaft of said valve driver shaft assembly being common to the three last said means, each said assembly being adjusted to cycle its cylinder, said shafts timed to stagger the functions of correspondingly ranked adjacent cylinders and to form a plurality of separate completely independent symmetrically functioning working units, staggered crankpins on said crankshaft, one to each file, the order of stagger being stepwise down-sequence from one end of said crankshaft to the other in respect to approach of said cylinders to the beginning of their respective work strokes, the measure of said crankpin stagger for two-cycle operation made to be, 360 degrees divided by the product of the number of cylinders in a file by the number of files in said engine.

4. In a rotary internal combustion engine of the expansion-reaction type, a static crankshaft, the rotor embodying a crankcase, cylinder-piston means comprising the expansion means and exhaust means comprising the reaction means, said cylinders mounted to said crankcase in rank and file, each successive pair of adjacent files thereof comprising a functionally separate "building block" unit for large engines, a rotary valve driver shaft assembly in each cylinder, each said assembly comprising intake and exhaust valve means, fuel feeding means, and ignition timing means, the shaft of said valve driver shaft assembly being common to the three last said means, each said assembly being adjusted to cycle its cylinder, said shafts timed to cyclically stagger the functions of correspondingly ranked cylinders of said paired files and to form a plurality of separate completely independent symmetrically functioning working units, staggered crankpins on said crankshaft, one for each unit, the order of the stagger being stepwise down-sequence from one end of said crankshaft to the other in respect to approach of said cylinders to the beginning of their respective work stroke, the measure of said crankpin stagger for four-cycle operation made to be, 360 degrees divided by the product of the number of cylinders in a file by the number of pairs of files in said engine, said cycle stagger between said paired files of said units made to be one revolution, the first file of each unit first as to cycle function.

5. In a rotary internal combustion engine of the expansion-reaction type embodying cylinder-piston means rotating about a static crankshaft, and pin-wheel type exhaust jetting means, self circum-cycled "building block" units of cylinders superposed for multi-cylinder engines, said cylinders outstandingly held in rank and file on the crankcase, crankpins on said crankshaft, one to each unit, said pins staggered in stepwise down-sequence from one end to the other, the degrees of pin-stagger precisely, 360 degrees divided by the product of the number of cylinders in a file times the number of units in said engine, said crankcase sectioned and held together by flange bolting and by longitudinal thru-bolts passing between said ranks of cylinders, like functions of the aforesaid units uniformly staggered in a cyclical sense between the angle subtended by adjoining ranks.

6. In an engine as set forth in claim 5, a travelwise forwardly faced opening into said crankcase for ram charging, a cylindrical shroud enclosing said cylinders, passages therethrough for axial flow of coolant air, said passages also facing forward for ramming and a centrifugal fan on the rear end of said engine to draw air and burned gases thru said shroud and discharge them therefrom.

7. In an internal combustion engine of the expansion-reaction type having a static crankshaft, the rotor thereof embodying at least one off-radial outstanding cylinder rotatable about said crankshaft, with a piston reciprocatable in said cylinder, a valve driver shaft assembly axial to said cylinder, the shaft thereof passing thru said piston, rotary exhaust and intake valves in said cylinder, said valve driver shaft cycling said engine, said valves comprising the cylinder and piston heads, the firing chamber between them, an exhaust bonnet for jetting the burned gases contra-spinwise for reaction, a channel in said valve driver shaft for conveying fuel to said firing chamber, said piston acting as a valve element to admit said fuel thereto, an ignition timing breaker box coaxial with said valve driver shaft, said box pivotably adjustable for still-setting, said box supported to said cylinder, said valve driver shaft extending into said box, a cam on said extension for timing the incidence of ignition in said firing chamber and means responsive to variations in speed of said engine when running, for advancing said incidence from that of the still-setting incidence.

8. In two and four cycle internal combustion piston engines of the expansion-reaction type, a stationary crankshaft, a crankpin on said crankshaft, a radially disposed cylinder rotatable about said crankshaft, a firing chamber in, and an exhaust orifice on said cylinder, means directing said orifice for contra-spinwise discharge of the exhaust gases from said combustion, a piston reciprocatable in said cylinder, a connecting rod, said rod reciprocatively connecting said piston to said crankpin, a valve driver shaft in said cylinder, a fuel channel in said shaft, said channel terminating in said firing chamber, means to rotate said shaft in timed relation to said rotation of said cylinder, an intake and an exhaust valve common to said firing chamber and to said valve driver shaft, an adjustable ignition timer individual to each cylinder, a primary ignition current make-and-break cam on said valve driver shaft, a fuel source, a rotating fuel trough and means for delivering said fuel to said fuel trough, an exit tube from said trough to said fuel channel in said valve driver shaft, a fuel seal between said tube and said valve driver shaft, said shaft driving said intake and said exhaust valves and said make-and-break cam, the terminal end of said fuel supply channel in said valve driver shaft together with said piston comprising a fuel cycling means, and means to isolate said fuel against pre-ignition during its journey to said combustion chamber.

References Cited in the file of this patent

UNITED STATES PATENTS

| | | |
|---|---|---|
| 685,141 | Hirth | Oct. 22, 1901 |
| 1,315,847 | Langman | Sept. 9, 1919 |
| 1,319,756 | Chorlton | Oct. 28, 1919 |
| 2,419,787 | Muffly | Apr. 29, 1947 |
| 2,491,693 | Sivertsen | Dec. 20, 1949 |
| 2,512,909 | Beaven | June 27, 1950 |